United States Patent
Lomax et al.

(10) Patent No.: US 10,197,214 B2
(45) Date of Patent: Feb. 5, 2019

(54) SECURING ASSEMBLY (71) Applicant: BRL PATENTS LIMITED, Hornby, Christchurch (NZ)

(72) Inventors: William James Lomax, Christchurch (NZ); Eu Ving Au, Christchurch (NZ); Adam Francis Walker, Christchurch (NZ); Peter Raymond Dennis, Christchurch (NZ)

(73) Assignee: ONGUARD GROUP LIMITED (NZ)

( * ) Notice: Subject to any disclaimer, the term of this patent is extended or adjusted under 35 U.S.C. 154(b) by 83 days.

(21) Appl. No.: 15/033,166

(22) PCT Filed: Nov. 4, 2014

(86) PCT No.: PCT/IB2014/065777
§ 371 (c)(1),
(2) Date: Apr. 29, 2016

(87) PCT Pub. No.: WO2015/068098
PCT Pub. Date: May 14, 2015

(65) Prior Publication Data
US 2016/0273700 A1    Sep. 22, 2016

(30) Foreign Application Priority Data

Nov. 5, 2013 (NZ) .................................... 617378
Apr. 17, 2014 (NZ) .................................... 623961

(51) Int. Cl.
*F16M 1/00* (2006.01)
*F16M 7/00* (2006.01)
*F16M 5/00* (2006.01)
*F16M 9/00* (2006.01)

(52) U.S. Cl.
CPC ................ *F16M 7/00* (2013.01); *F16M 5/00* (2013.01); *F16M 9/00* (2013.01)

(58) Field of Classification Search
CPC ............... F16M 7/00; F16M 5/00; F16M 9/00
USPC ....... 248/188.2, 188.4, 501, 502, 503.1, 649, 248/650, 677, 688, 507, 679, 907
See application file for complete search history.

(56) References Cited

U.S. PATENT DOCUMENTS

| 3,356,324 | A |   | 12/1967 | Attermeyer |
| 3,512,738 | A | * | 5/1970 | Galbarini ............. B23Q 1/0054 |
|   |   |   |   | 248/508 |
| 3,713,259 | A |   | 1/1973 | Tkach |
| 3,730,463 | A |   | 5/1973 | Richard |
| 4,200,256 | A |   | 4/1980 | Thiel |
| 4,602,463 | A |   | 7/1986 | Holowatyj |
| 5,110,082 | A | * | 5/1992 | Rowan, Jr. ............... F16M 7/00 |
|   |   |   |   | 248/649 |

(Continued)

FOREIGN PATENT DOCUMENTS

| JP | S60104900 | 6/1985 |
| JP | 2006038011 | 2/2006 |

(Continued)

*Primary Examiner* — Gwendolyn W Baxter
(74) *Attorney, Agent, or Firm* — Galbreath Law Offices, P.C.; John A. Galbreath (57) ABSTRACT

A securing assembly for an article, said securing assembly including: a footing adapted to be securable to a floor or a similar supporting surface underneath said article; a securing rod dimensioned and arranged to be releasably and rigidly securable between said article and said footing.

10 Claims, 12 Drawing Sheets

(56) References Cited

U.S. PATENT DOCUMENTS

| | | | |
|---|---|---|---|
| 5,163,256 A | 11/1992 | Fukumoto | |
| 6,085,472 A | 7/2000 | Malhotra | |
| 6,206,613 B1 | 3/2001 | Elkins | |
| 6,902,140 B1 * | 6/2005 | Huang | E06C 7/44 248/188.2 |
| 7,441,743 B2 * | 10/2008 | Behlinger | F16M 7/00 248/679 |
| 9,249,591 B2 * | 2/2016 | Sugita | F16F 15/02 |
| 2001/0019096 A1 | 9/2001 | Andreoli | |
| 2003/0205008 A1 | 11/2003 | Sridhara | |
| 2004/0000104 A1 | 1/2004 | Fanucci | |
| 2012/0180423 A1 | 7/2012 | Avila | |

FOREIGN PATENT DOCUMENTS

| | | | |
|---|---|---|---|
| WO | WO 2006/039924 | 4/2006 | |
| WO | WO 2013/125231 | 8/2013 | |
| WO | WO-2016193913 A1 * | 12/2016 | E04B 1/41 |

* cited by examiner

SECURING ASSEMBLY

TECHNICAL FIELD

The present invention relates to a securing assembly for permanently or semi-permanently securing large articles to a floor or similar underlying supporting structure. The securing assembly of the present invention has been developed for anchoring wine tanks, and will therefore be described with particular reference to that application. However, it will be appreciated that the securing assembly of the present invention could be used to secure any of a wide range of articles (e.g. dairy holding tanks, petrochemicals tanks, containers for hazardous goods).

BACKGROUND ART

Figure 1:
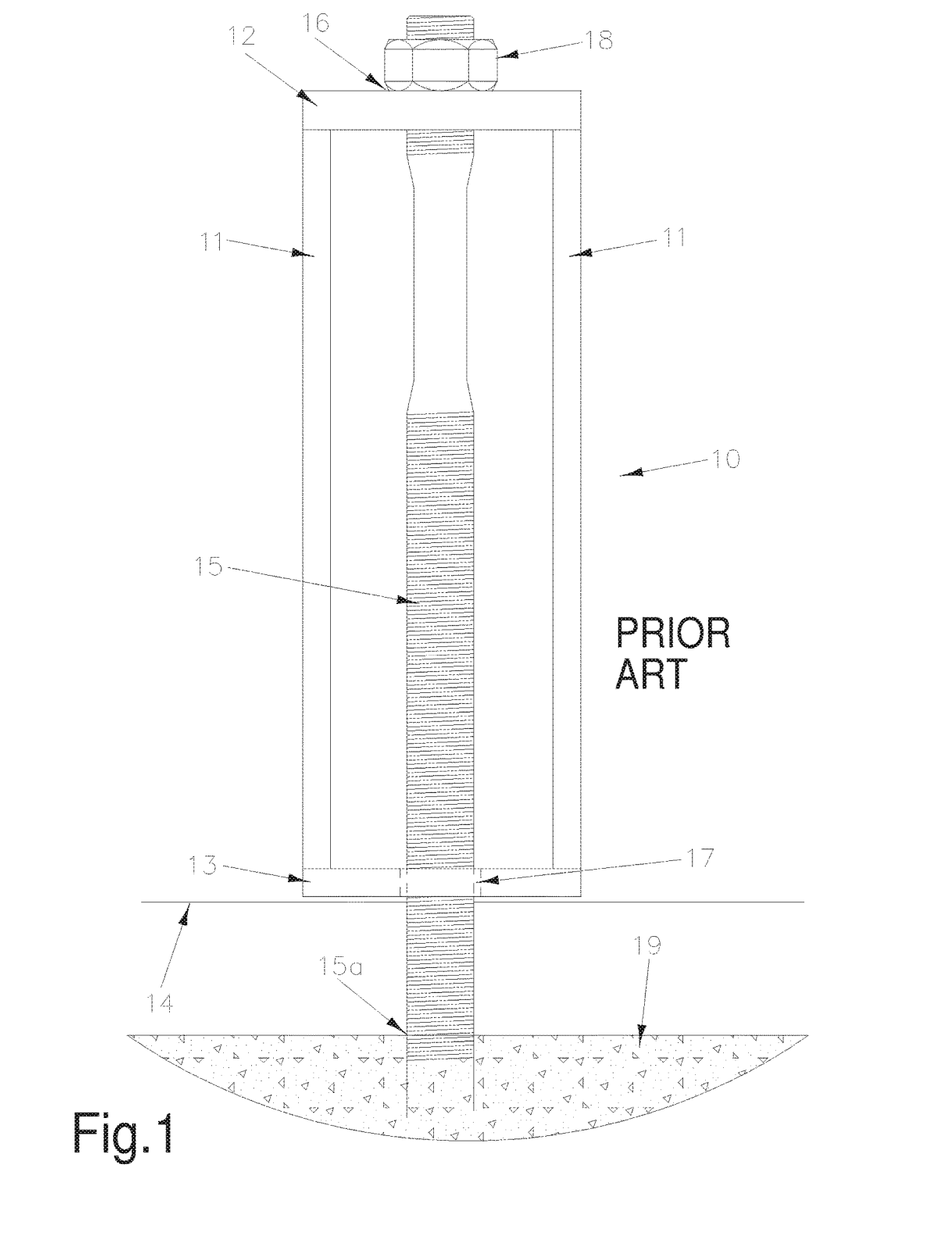
FIG. 1 is a side view of an anchoring bracket in accordance with the prior art.

It is known to secure wine tanks using an anchoring bracket of the type shown in FIG. 1:—an open fronted housing 10 with spaced apart parallel sides 11, top plate 12, and bottom plate 13 is welded on to the side of a tank 14, and a screw threaded rod 15 passes through apertures 16, 17 in the top and bottom plates respectively. The lower end 15a of the rod 15 is concreted into the underlying floor 19, to retain the tank in position. A number of these anchoring brackets are located around the perimeter of the tank.

The above described construction has major drawbacks:
  if the rod 15 yields, (e.g. as a result of the movement of the tank in an earthquake) then the surrounding floor must be dug up to release the lower end of the rod, so that the damaged rod can be replaced;
  if the rod 15 has been stretched, the securing nut 18 will be spaced above the top plate 12, and the rod therefore will not restrain movement of the tank at all, until the tank moves enough to bring the top plate 12 back into contact with the nut 18.

DISCLOSURE OF INVENTION

An object of the present invention is the provision of a securing assembly which overcomes one or both of the above-described drawbacks.

The present invention provides a securing assembly for an article, said securing assembly being capable of securing against both tensile and compressive forces including:
  a footing adapted to be securable to a floor underneath said article;
  a securing rod dimensioned and arranged to be releasably and rigidly securable to said article and to said footing;
  said securing rod providing a first portion at one end thereof and a second portion at the other end thereof, and a third portion having reduced strength compared to said first and second portions, between said first and second portions;
  a bearing dimensioned and arranged to surround and support a substantial proportion of said securing rod;
  wherein said securing rod is arranged to be releasably and rigidly securable to said article via a housing which is rigidly securable to said article and which provides a top plate which is releasably engageable with said first portion of said securing rod; and
  wherein said first portion of the securing rod is formed with a shoulder which has a larger cross-sectional area than the remainder of said first portion, said shoulder being located between said third portion and the remainder of said first portion; and
  wherein said top plate is apertured, the dimensions of said aperture being such as to allow said remainder of said first portion to pass through, but to engage said shoulder, such that the adjacent surfaces of the shoulder and the top plate bear against each other.

Preferably, said assembly further provides a sleeve dimensioned and arranged to surround and support said bearing.

Preferably, the footing includes an anchor plate which is U-shaped in plan and which provides a cutout in the surface of the plate which is closest to the floor in use; said cutout being dimensioned to accommodate the base of a socket which is releasably engageable with said anchor plate and which is designed to be in screw threaded engagement with the second portion of the rod.

In both of the above embodiments, preferably said bearing surrounds said third portion of the rod.

Preferably, the external surfaces of said first and second portions are screw threaded in opposite directions.

Preferably, said third portion has a reduced cross-sectional area compared to said first and second portions.

Said third portion may be formed separately from said first and second portions and rigidly secured thereto; alternatively, said first, second and third portions may be integrally formed.

Preferably, said footing includes an anchor plate which is releasably securable to said floor, e.g. by bolts.

Said bearing may be formed as two or more pieces, but preferably is formed as a one piece slotted cylinder.

The present invention further provides a system for securing an article said system including:
  providing a plurality of securing assemblies in accordance with the first embodiment;
  for each securing assembly, rigidly securing the housing to the article at a selected position around the outer surface of the article;
  for each securing assembly, securing said footing to a floor or similar supporting surface underneath said article.

BRIEF DESCRIPTION OF THE DRAWINGS

By way of example only, a preferred embodiment of the present invention is described in detail with reference to the accompanying drawings, in which:—

BEST MODE FOR CARRYING OUT THE INVENTION

Referring to FIGS. 2-11, a securing assembly 20 in accordance with a first embodiment of the present invention includes a housing 21, a securing rod 22, and a footing 23.

Figure 2:
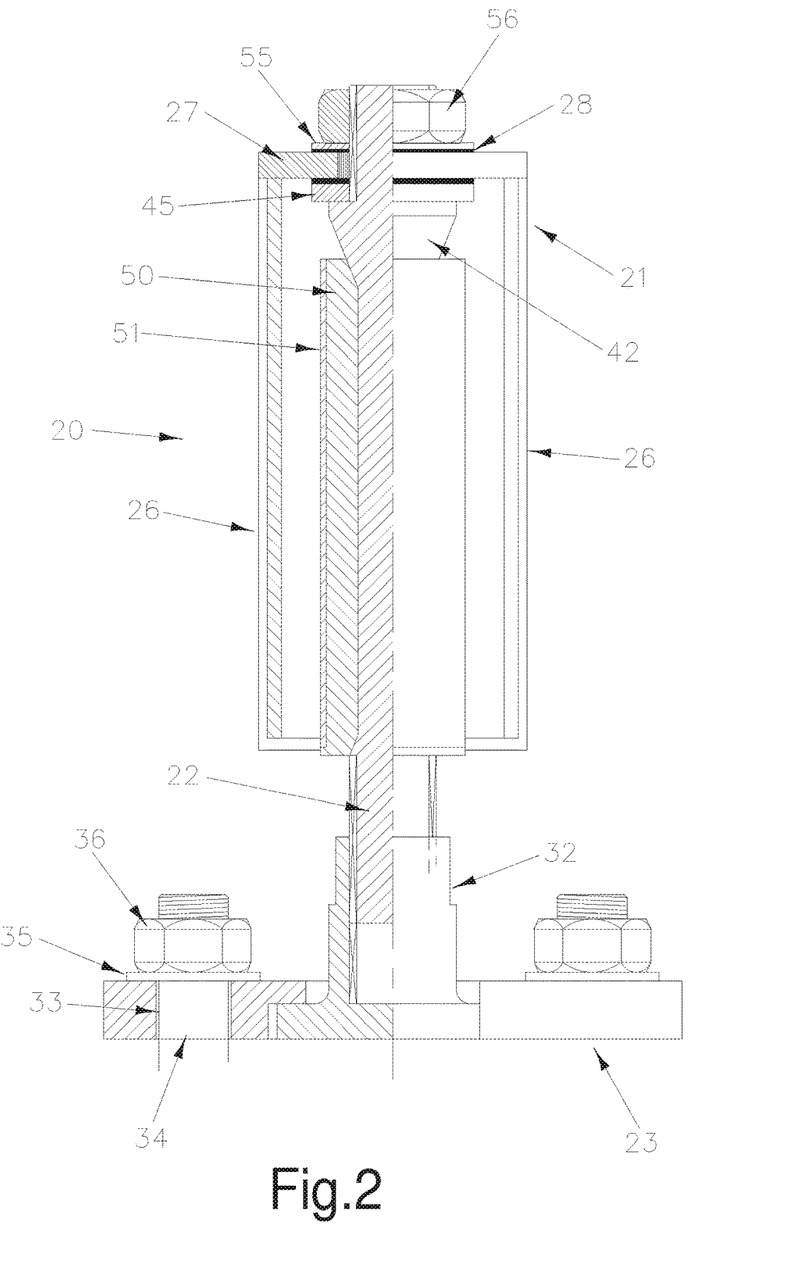
FIG. 2 is a partial longitudinal section through a securing assembly in accordance with a first embodiment of the present invention.

The housing 21 is designed to provide a strong, rigid attachment to the article to be secured by the securing assembly. As depicted, the housing 21 is designed to be bolted to the article, but it will be appreciated that any suitably robust rigid form of securement, (e.g. welding) could be used instead.

Figures 10, 11:
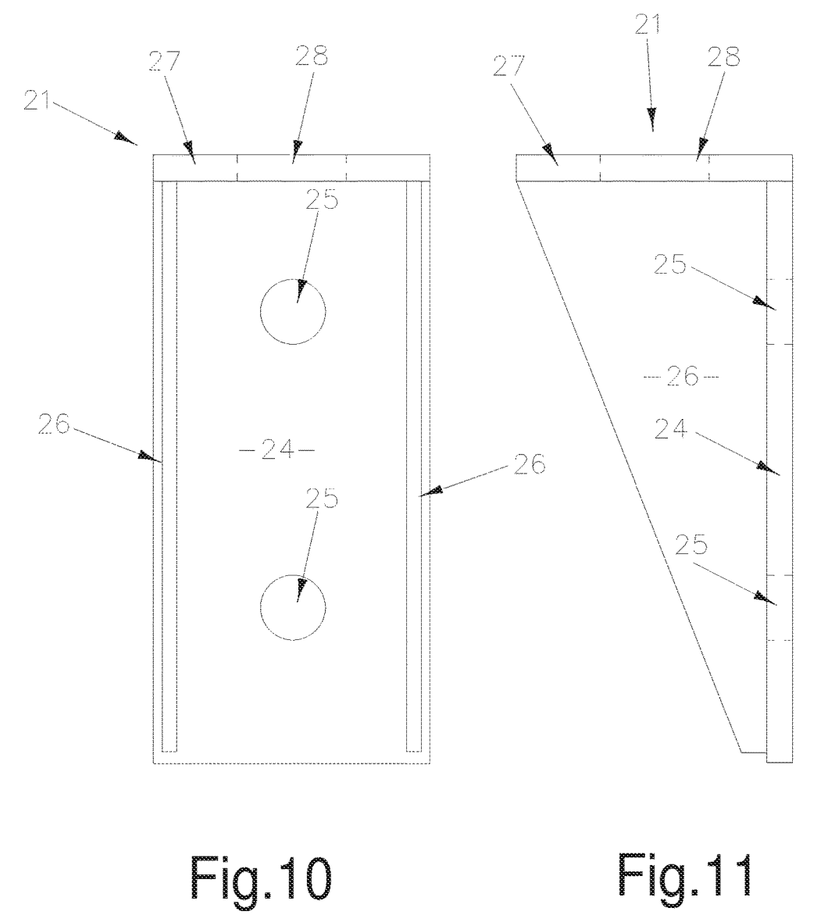
FIGS. 10 and 11 are respectively front and side views of the housing of the present invention.

The housing 21 is shown in greater detail in FIGS. 10 and 11, and consists of a backplate 24 which is formed with two holes 25 for bolting the housing to the article to be secured, a pair of spaced, opposed sides 26, and an apertured top plate 27.

The sides 26 are spaced apart by the width of the backplate 24, and each side is roughly triangular in side view, as shown in FIG. 11. The aperture 28 in the top plate 27 is of sufficient size to admit the top of the securing rod 22, as hereinafter described. The base of the housing is open, i.e. there is no bottom plate corresponding to the top plate 27.

The footing 23 is designed to provide a robust but releasable attachment to the floor or other supporting surface underlying the article to be secured. In most cases, this would be a concrete floor.

Figure 3:
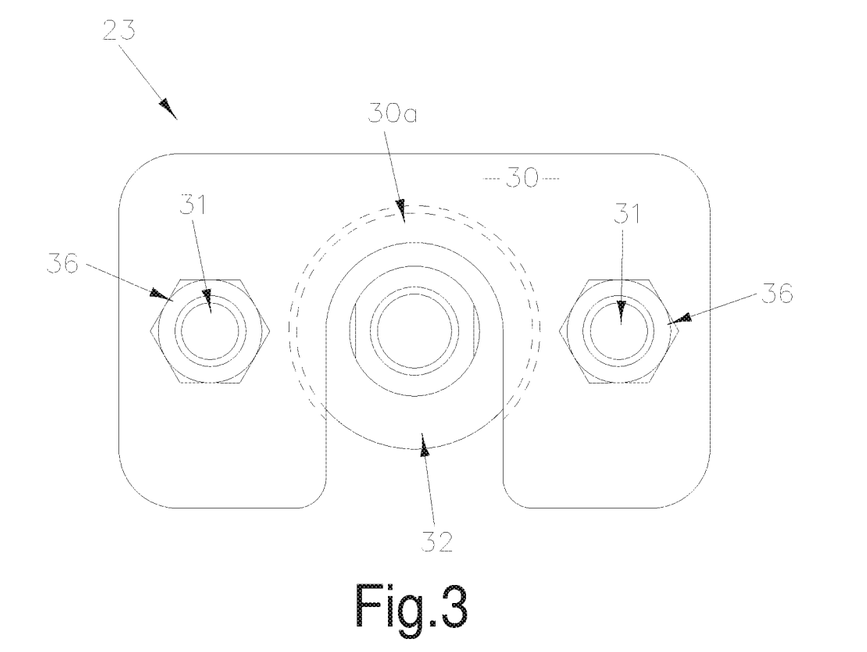
FIG. 3 is a plan view of the lower part of the securing assembly of FIG. 2.
Figure 4:
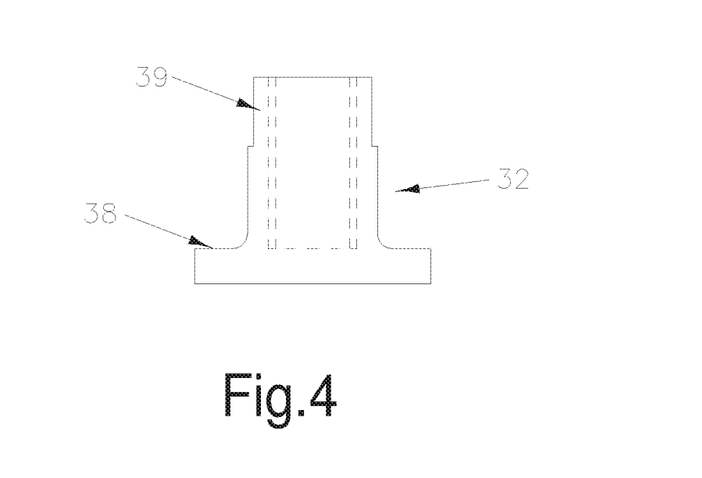
FIG. 4 is a side view of one of the components of FIG. 3.

The footing 23 is shown in greater detail in FIGS. 3 and 4, and consists of four parts:—a U-shaped anchor plate 30, two bolts 31, and a socket 32.

Each of the limbs of the "U" of the anchor plate 30 is formed with a through hole 33 (FIG. 2 only) to admit a securing bolt 34 which in use passes through the corresponding hole 33 to anchor the footing 23 to the underlying surface; the upper end of each bolt 34 is secured in known manner by a washer 35 and a nut 36.

The socket 32 is circular in plan, with a larger diameter base 38 supporting an integrally formed tubular up stand 39, which is internally screw threaded.

The anchor plate 30 is undercut in the centre portion, to provide an overlying plate 30a under which the base 38 of the socket 32 can slide as shown in FIGS. 2 and 3, to anchor the socket 32 to the anchor plate 30. In this position, the socket 32 is firmly secured to the anchor plate 30, with the up stand 39 of the socket extending upwards from the rest of the footing.

Figure 5:
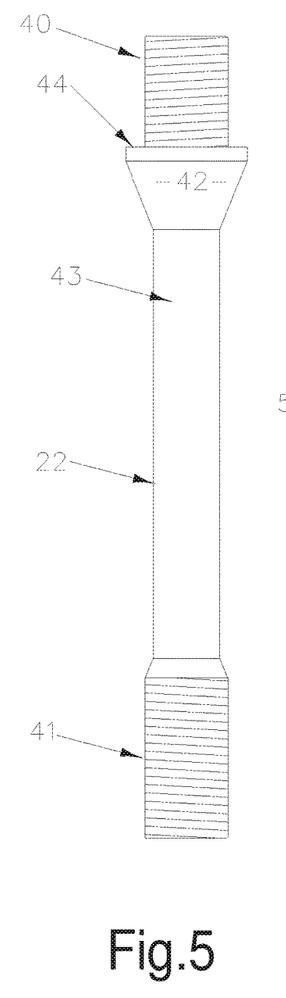
FIG. 5 is a side view of the securing rod of FIG. 2.
Figure 6:
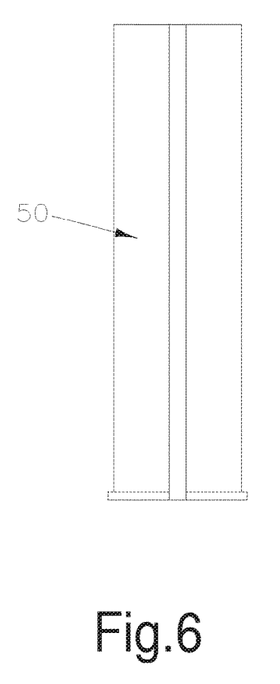
FIGS. 6 and 7 are respectively a side view and a plan view of the bearing of FIG. 2.
Figure 7:
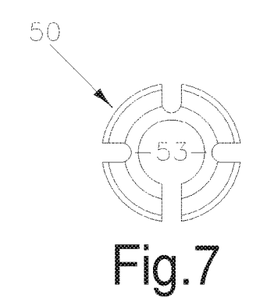

The securing rod 22 is formed with screw threaded portions 40, 41 at its upper and lower ends respectively, a frustoconical portion 42 immediately below the upper threaded portion 40, and a reduced strength portion in the form of a reduced diameter central portion 43 which provides a major portion of the length of the rod 22. The portions 40, 41 are oppositely screw threaded. The upper screw threaded portion 40 has a diameter slightly less than the diameter of the aperture 28 in the top plate 27, so that the portion 40 can pass through this aperture, as shown in FIG. 2. The diameter of the larger, upper, end of the frustoconical portion 42 is greater than the diameter of the aperture 28, so that the upper surface 44 of the frustoconical portion provides a shoulder to engage (via a washer 45) the underside of the top plate 27, when the rod 22 is positioned as shown in FIG. 2.

Figure 8:
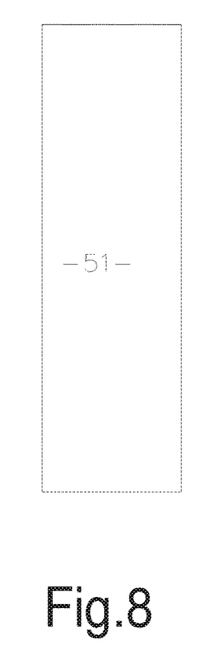
FIGS. 8 and 9 are respectively a side view and a plan view of the sleeve of FIG. 2.
Figure 9:
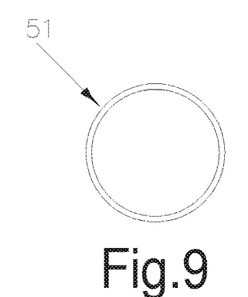

As shown in FIG. 2, in use the portion 43 of the rod 22 is surrounded by a heavy duty cylindrical bearing 50 (FIGS. 6 and 7), which is in turn surrounded and supported by a cylindrical sleeve 51 (FIGS. 8 and 9). The bearing 50 and the sleeve 51 both are slightly longer than the portion 43 of the rod 22.

The bearing 50 is thick-walled and may be formed of any suitable robust, impact resistant material, such as a suitable plastics material; the bearing 50 may be formed as a sleeve or (as shown) as a split bearing, to enable the bearing to be fitted over the rod 22. The central aperture 53 of the bearing 50 is dimensioned so as to be a snug fit around the exterior of the rod 22, as shown in FIG. 2. The interior diameter of the sleeve 51 is such that the sleeve is a snug fit around the exterior of the bearing 50, so that the sleeve supports the bearing.

The bearing 50 and/or sleeve 51 can be omitted for some applications.

The above described components are assembled as follows:—the housing 21 is rigidly secured to a suitable point on the article to be secured, (e.g. the side of a wine tank). Depending upon the dimensions and shape of the article to be secured, several spaced securing assemblies in accordance with the present invention may be used to secure a single article. The housing 21 is secured such that when the rod 22 is positioned as shown in FIG. 2, the lower end of the rod 22 screw threadedly engages the upper part of the socket 32 when the footing 23 is bolted down to the floor.

Next, the bearing 50 and the sleeve 51 are slid into position over the portion 43 of the rod 22.

The lower end of the rod 22 is screwed right into the screw thread in the up stand 39 of the socket 32, so that the lower end of the rod 22 is adjacent the lower end of the screw thread in the up stand. The washer 45 is then placed over the upper end of the rod 22, so the washer 45 engages the upper surface 44 of the frustoconical portion 42.

Next, the rod 22 carrying the bearing 50 and sleeve 51 and the socket 32 is slid upwards into the housing 21 until the upper screw threaded portion 40 of the rod 22 extends through the aperture 28 in the top plate 27, and the upper surface of the washer 45 engages the underside of the top plate 27. A further washer 55 is then placed on top of the top plate 27 around the aperture 28 and the rod 22 is secured in position by engaging a nut 56 with the screw threaded portion 40.

The socket 32 is then partially unscrewed from the lower end of the rod 22, until the base 38 contacts the floor. The rest of the footing 23 is then installed, with the overlying plate 30a extending over part of the base 38 to secure the socket 32 in position, and the anchor plate 30 secured to the floor by the bolts 34 and nuts 36.

The article to which the housing 21 is attached is now rigidly secured to the floor. Movement of the article in any direction is restrained by the engagement of each rod 22 with the corresponding footing 23. If the tank comes under an additional load, the rods 22 will of course be subjected to loading in tension or compression, or cycles of these forces. Typically, an earthquake would cause multiple horizontal forces on the tank or other article, resulting in the vertical forces on the rods 22 as the article tries to overturn.

If these forces cause a loading on any of the rods 22 which is within the elastic range of the rod material, then each rod will return to its original shape when the loading ceases. However, if the loading on any of the rods exceeds the yield strength of material (i.e. exceeds the elastic deformation range) permanent deformation of the rod will result. The portion of the rod which will tend to be deformed is the reduced strength portion 43, and the presence of the bearing 50 and the sleeve 51 will assist in keeping the rod straight and correctly aligned and in particular will assist the rod to resist buckling in compression.

In the event that the portion 43 is plastically deformed because of excessive loading on the article, the rod 22 can be replaced by releasing the nut 56, releasing the anchor plate 30, disengaging the socket 32 from the anchor plate 30 and screwing the socket 32 as far up the lower end of the rod as possible, to allow sufficient space to remove the rod 22, bearing 50 and sleeve 51 from the housings 21, so that the rod 22 (and if necessary the bearing 50 and the sleeve 51 as well) can be replaced. These components are then refitted as described above.

It will be appreciated that the above described securing assembly provides a robust and relatively low cost means for securing an article. Further, the components of the securing assembly can be easily checked for damage and are straight-forward to replace without damage to the article or to the underlying floor.

The material of which the rod 22 is made, and the length and diameter of the portion 43, are selected with reference to the shape and weight of the article being secured, to ensure that the rod 22 of the or each securing assembly is sufficiently strong to restrain all normal movement of the article, but that if excessive movement of the article occurs, (e.g. as an earthquake) then the portion 43 of the or each rod 22 will be first elastically, then plastically, deformed before either the article is damaged or the housing 21 is torn off the article, or the bolts 34 fail and the assembly is torn out the floor.

FIGS. 12-21 show a second embodiment of the invention.

Referring to FIGS. 12-21, a securing assembly 60 includes a top plate 61, a securing rod 62 and a footing 63. The footing includes an anchor plate 64 and a socket 65, which is internally screw threaded.

Figure 20:
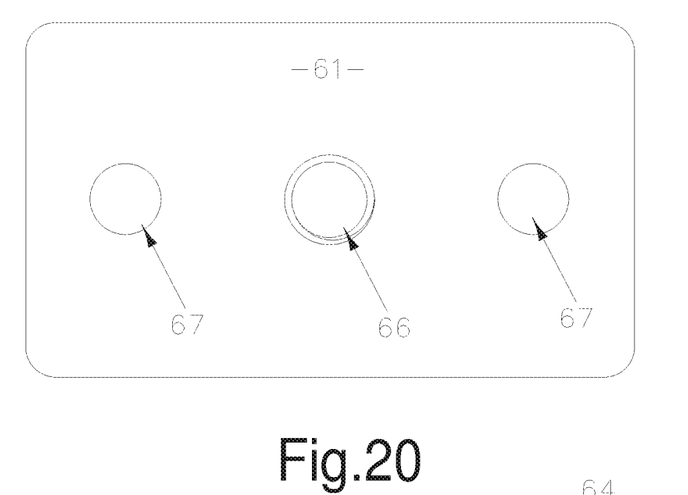
FIG. 20 is a plan view of the top plate.

The top plate 61 is shown in plan view in FIG. 20 and comprises a flat plate which is rectangular in plan and which is provided with a central screw threaded aperture 66 and plain apertures 67 which are equidistantly spaced one on each side of the central aperture 66. The central aperture 66 is dimensioned to engage a first larger diameter portion of the securing rod 62 (as described below), and the apertures 67 are dimensioned to allow securing bolts 68 to pass through.

Figure 12:
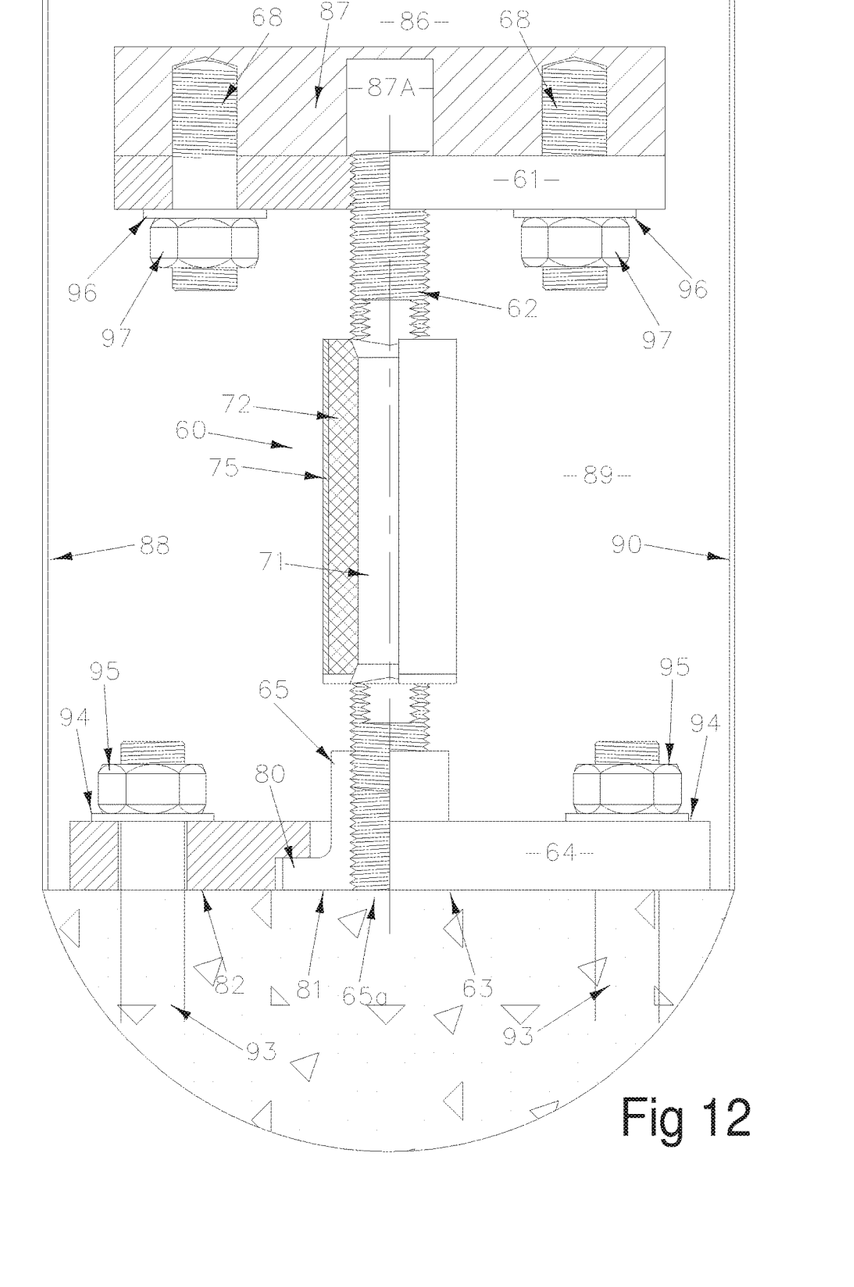
FIG. 12 is a side view, partly in longitudinal section, through a securing assembly in accordance with a second embodiment of the present invention.

The securing rod 62 in use provides the connection between the article to be secured and the floor or other underlying surface. The rod 62 may be made of any of a range of strong, ductile, durable materials, and may be coated if necessary.

Figure 14:
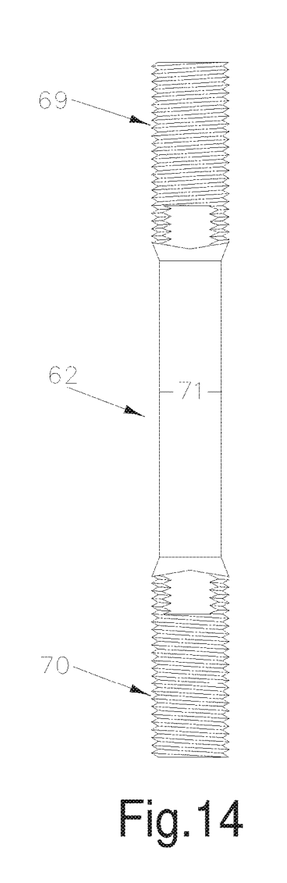
FIG. 14 is a side view of the securing rod of FIG. 12.

The securing rod 62 is shown in greater detail in FIG. 14. The ends of the securing rod 62 are screw threaded and provide a first larger diameter portion 69 and a second larger diameter portion 70, with a reduced strength portion in the form of a reduced diameter third portion 71 between the two larger diameter portions. The first and second portions 69, 70 are screw threaded in opposite directions.

Reducing the diameter (and hence reducing the strength) of the securing rod over part of the length of the rod ensures that if the securing rod is stressed, the portion of the rod which will tend to be deformed is this reduced diameter portion 71.

Figure 15:
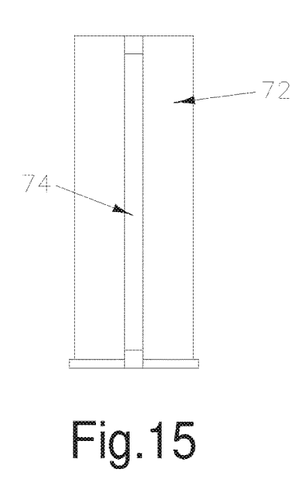
FIGS. 15 and 16 are respectively a side view and a plan view of the bearing of FIG. 12.
Figure 16:
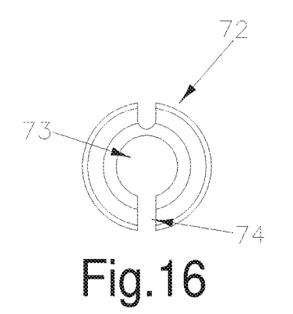

To support the reduced diameter portion 71 of the rod, it is surrounded by a cylindrical bearing 72 depicted in FIG. 5. The bearing 72 is formed as a slotted cylinder with an internal channel 73 which is dimensioned to be a snug fit around the exterior of the reduced diameter portion 71. The slot 74 in the bearing 72 enables the bearing to be snap fitted around the rod. The bearing 72 is thickwalled and may be formed of any suitable robust, impact resistant material, preferably a suitable plastics material with a low coefficient of friction so that the bearing does not bind on the rod 71 if there is relative movement between the two.

Alternatively, the bearing 72 may be formed as two or more sections, which may be separate or linked together.

Figure 17:
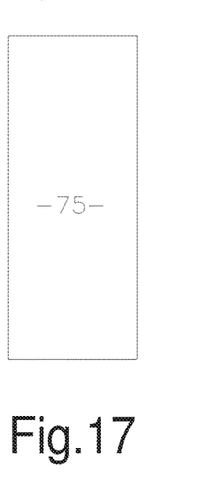
FIGS. 17 and 18 are respectively a side view and a plan view of the sleeve of FIG. 12.
Figure 18:
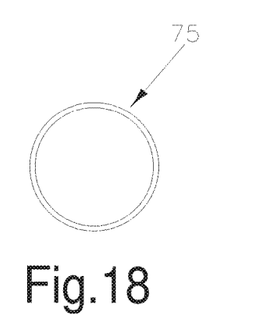

The bearing 72 is protected and contained by a cylindrical sleeve 75, as shown in FIG. 17. The interior diameter of the sleeve 75 is such that the sleeve is a snug fit around the exterior of the bearing 72, so that the sleeve supports the bearing.

Figure 19:
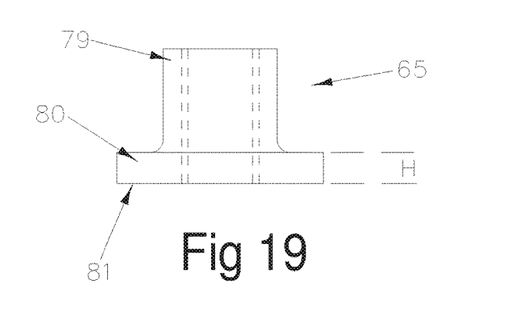
FIG. 19 is a side view of the socket of FIG. 12.
Figure 21:
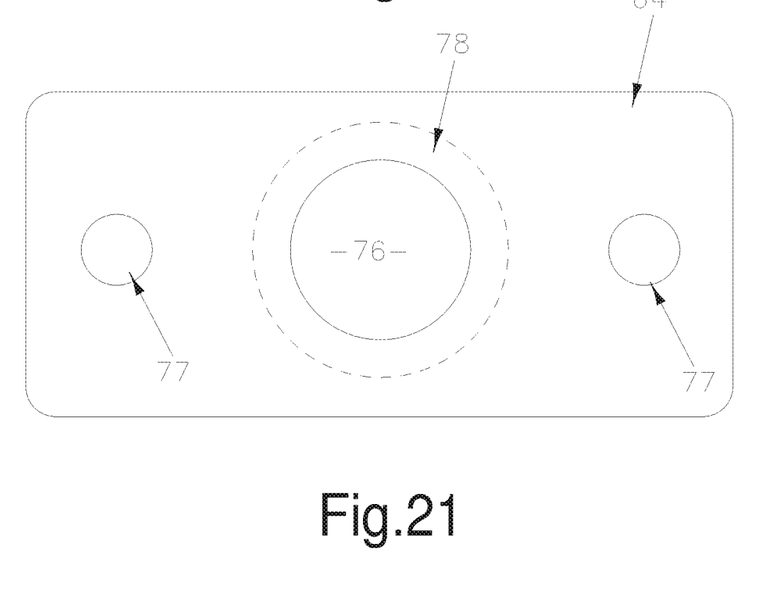
FIG. 21 is a plan view of the anchor plate.

The footing 63 is shown in FIGS. 19 and 21, and consist of an anchor plate 64 and a socket 65. The anchor plate 64 is a flat plate, rectangular in plan and formed with a central aperture 76 and two smaller apertures 77 arranged one on each side of the central aperture 76, equidistantly spaced from it. The central aperture 76 is formed with a concentric circular cross-section indentation 78 on the underside of the anchor plate.

The socket 65 is circular in cross-section and consists of a first portion 79 one end of which is surrounded by an integrally-formed concentric circular flange 80. As shown in FIGS. 12 and 19, the first portion 79 of the socket is open at both ends, and is internally screw threaded to receive the second larger diameter portion 70 of the securing rod 62. The length of the screw thread is longer than is required to accommodate the rod 62, to allow that end of the rod to move down into the lower end of the socket when the securing assembly is being installed. The depth of the indentation 78 on the underside 82 of the anchor plate, and the height H of the flange 80, are such that the flange 80 can lie underneath the anchor plate 64 with the base 81 of the flange 80 and the underside 82 of the anchor plate flat on the floor.

Preferably, the height H is such that the socket 65 can be angled somewhat, relative to the anchor plate, so that the securing rod 62 can be at an angle other than a right angle to the plane of the anchor plate 64, in case it is necessary to accommodate a sloping floor.

Figure 13:
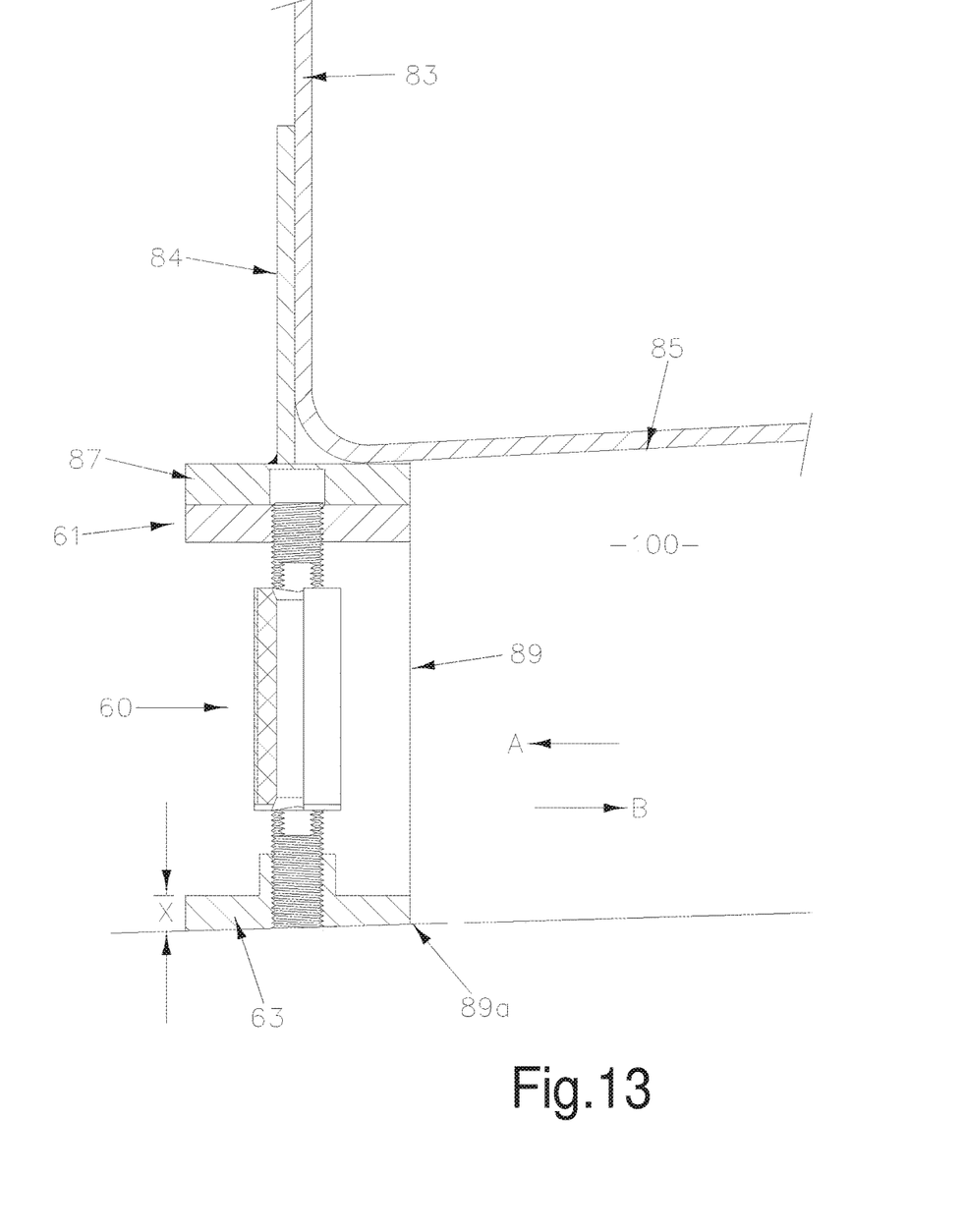
FIG. 13 is a diagrammatic view, taken at right angles to FIG. 12, showing the arrangement of the lower part of the tank wall and tank skirt.
Figure 22:
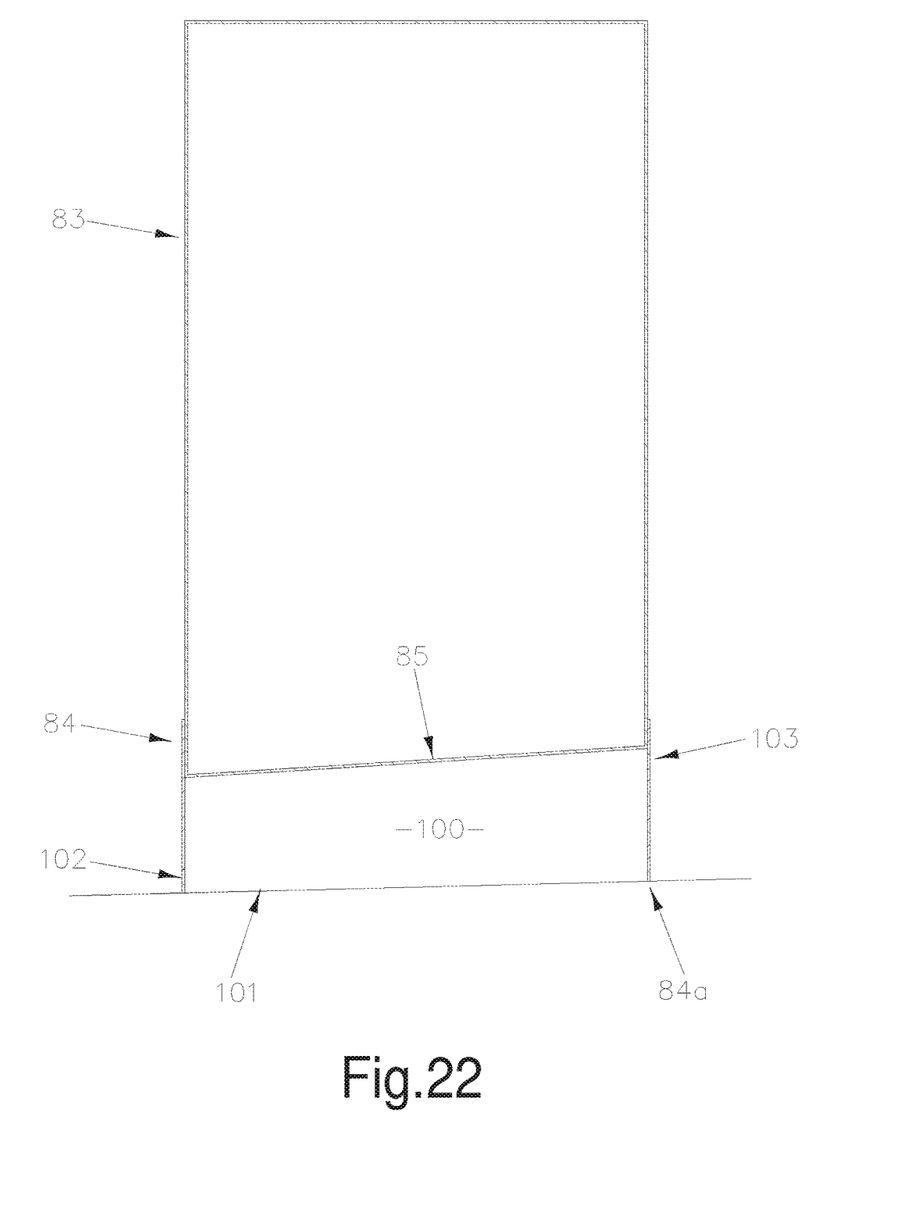
FIG. 22 is a diagrammatic longitudinal section showing the arrangement of the tank and tank skirt.

The above-described securing assembly is used to secure a wine tank as follows: as shown in FIGS. 12, 13 and 22, a generally cylindrical wine tank 83 is provided with a skirt 84 which is secured around the outer perimeter of the tank and extends below the base 85 of the tank. As shown in FIG. 22, wine tanks typically are fabricated with a sloping base 85, and the height of the skirt 84 is adjusted to accommodate this slope.

Generally, the skirt 84 is made of the same material as the tank (typically stainless steel) and is secured to the exterior of the tank by welding. The skirt 84 overlaps the end of the tank as shown in FIG. 13. The lower edge 84a of the skirt is sloped as necessary to accommodate any slope in the underlying floor:—typically, the floors of wine tank storage areas are designed with a slight slope, (e.g. 2%) to facilitate cleaning. The slope is exaggerated for clarity in FIG. 22.

Depending upon the size and weight of the tank, the tank normally would be secured by anything from 4 to 30 securing assemblies, equidistantly spaced around the circumference of the tank. To accommodate each of the securing assemblies, a recess is formed at the appropriate place around the circumference of the skirt, as follows:—a cutout 86 is formed at the appropriate place in the skirt of the tank, and is reinforced by a steel plate 87 welded to it, forming the "roof" of the recess in the tank skirt. The back and sides of each recess are formed by three mutually perpendicular plates 88, 89 and 90. The vertical edges of the sides 88, 90 are welded to the adjacent vertical sides of the recess, and the upper edge of the back 89 is welded to the adjacent portion of the cutout 86.

Each recess is designed simply to prevent concrete from escaping when concrete is pumped in under the base of the tank as described below, and apart from the reinforced roof, is not required to bear a high loading.

The tank, skirt and recesses, plus the reinforcing plate 87 on the roof of each recess, normally are formed at the time of manufacture of the tank. At the same time, the reinforcing plate 87 is pre-drilled with threaded holes to receive the bolts 68 used to secure the top plate 61 in position.

The reinforcing plate 87 also is formed with a blind aperture 87a which corresponds it position to the central aperture 66 on the top plate 61, to allow room for the portion 69 of the securing rod 62 to move into the aperture 87a when the securing assembly is being installed.

Before the tank is positioned in the storage area, the concrete slab on which the skirt will rest is predrilled with holes corresponding to the bolts 93 required to secure each anchor plate 64 for each securing assembly. Each pair of bolts 93 is secured in position in the corresponding holes by placing the bolts in the drilled holes and securing them with epoxy resin.

Four equidistantly spaced securing assemblies are then assembled on four of the pairs of bolts 93. For each pair of bolts 93, a socket 65 is engaged with the corresponding recess 78 on the anchor plate 64, and the anchor plate 64 is secured in place on the bolts 93, with the bolts 93 extending through the apertures 77 in the anchor plate and fastened as shown in FIG. 12, with washers 94 and nuts 95, in known manner.

Each securing rod 62 is fitted with the corresponding bearing 72 and sleeve 75, both surrounding the reduced diameter portion 71 of the securing rod. The second larger diameter portion 70 of the securing rod 62 is screwed into the screw thread on the socket 65. The corresponding top plate 61 is then screwed onto the first larger diameter portion 69 of each securing rod 62, with the screw thread on said portion 69 engaging the screw threaded aperture 66 of the top plate.

The tank, already fitted with its skirt and recesses, is lowered into position with each of the pre-assembled securing assemblies corresponding to one of the recesses. Each of these securing assemblies is then attached to the corresponding recess by positioning each top plate 61 so that the apertures 67 in the top plate line up with the predrilled threaded holes in the reinforcing plate 87, and the securing bolts 68 are inserted as shown in FIG. 12 and secured with washers and 96 and nuts 97 in the usual way.

Each of the remaining securing assemblies is then fitted in one of the recesses (provided with a pre-fitted pair of bolts 93) around the tank skirt, as follows: the securing rod 62 is fitted with the corresponding bearing 72 and sleeve 75, both surrounding the reduced diameter portion 71 of the securing rod, as described above. Each assembly is completed by engaging each socket 65 with the corresponding recess 78 on the anchor plate 64, screwing the second larger diameter portion 70 of the securing rod 62 into the screw thread on the socket 65 until the end of the rod 62 reaches the end of the socket 65, and screwing the screw threaded aperture 66 of the corresponding top plate as far as possible onto the first larger diameter portion 69 of the securing rod 62. It will be noted that the screw threads on the portions 69, 70 are sufficiently long to allow both the top plate 61 and the anchor plate 64 to be moved closer together during installation, to allow sufficient room to lift the anchor plate 64 over the ends of the bolts 93.

Once each securing assembly is in position, the securing rod 62 is rotated to lower the anchor plate 64 and the socket 65 down onto the tops of the bolts 93, which are then secured with washers 94 and nuts 95 in the usual way. Simultaneously, the top plate 61 is reused until the top plate 61 aligns with the pre-drilled threaded holes in the reinforcing plate 87, to allow the upper securing bolts 68 to be inserted as shown in FIG. 2. The bolts 68 are secured with washers 96 and nuts 97 in the usual way.

Once the securing assemblies have been attached as described above, concrete is pumped into the gap 100 between the base 85 of the tank, the underlying floor 101, and the interior of the surrounding tank skirt 84 (see FIG. 22). Concrete is pumped in through the aperture 102 close to the base of the skirt, and pumping continues until concrete starts to ooze out of an aperture 103 close to the top of the skirt, just below the higher side of the sloped tank base 85.

If the tank comes under an additional load, the securing rods 62 will of course be subjected to loading in tension or compression or cycles of these forces. Looking specifically at the loading imposed in the event of an earthquake, typically this would cause multiple horizontal forces on the tank or other article, resulting in vertical forces in the rods as the article tries to overturn.

If these forces cause a loading on the rod 62 which is within the elastic range of the rod material, then each rod will return to its original shape when the loading ceases. However, if the loading on any of the rods exceeds the yield strength of the material, (i.e. exceeds the elastic deformation range) permanent deformation of the rod will result. In this case, the presence of the bearing 72, supported by the sleeve 75, will assist in keeping the securing rod straight and correctly aligned. This comment applies equally to the bearing 50 and sleeve 51 in the first embodiment.

It follows from this that if the securing assemblies are intended for an application where loadings are expected to remain within the elastic range of the rod material, then it may be preferable to omit using the bearings and supporting sleeves.

Once the rods have been loaded beyond their yield strength and have been deformed and strain hardened, they should be replaced; the bearings and sleeves can be reused. It will be appreciated that the replacement of the rods can be accomplished without dismantling the tank or the underlying floor, simply by reversing the installation process.

As shown in FIG. 12, an additional space 65a at the base of the socket 65 not only accommodates the installation, but also allows for precise adjustment of the socket relative to the corresponding securing rod 62, to accommodate any slope in the underlying floor. The socket 65 may be formed with spanner flats on the exterior (not shown) to enable the socket to be rotated relative to the anchor plate 64.

FIG. 13 shows diagrammatically the type of loading on the securing assembly from the horizontal forces imposed by an earthquake:—a force in the direction of arrow A tends to push the mass of concrete occupying the space 100 into the walls of the recess 89 forming part of the skirt. It should be noted that is important that the height X of the footing 63 is sufficient that the adjacent edge of the skirt 89a cannot be pushed over the footing 63.

A force in the opposite direction (arrow B) places an equivalent stress on the securing assembly on the opposite side of the tank to that shown in FIG. 13.

An existing tank formed without a skirt portion 84 may be retrofitted to provide a recessed skirt of the type described above, by providing a suitably dimensioned recessed skirt, wrapping it around the base of the existing tank, and then welding it in place.

Figure 23:
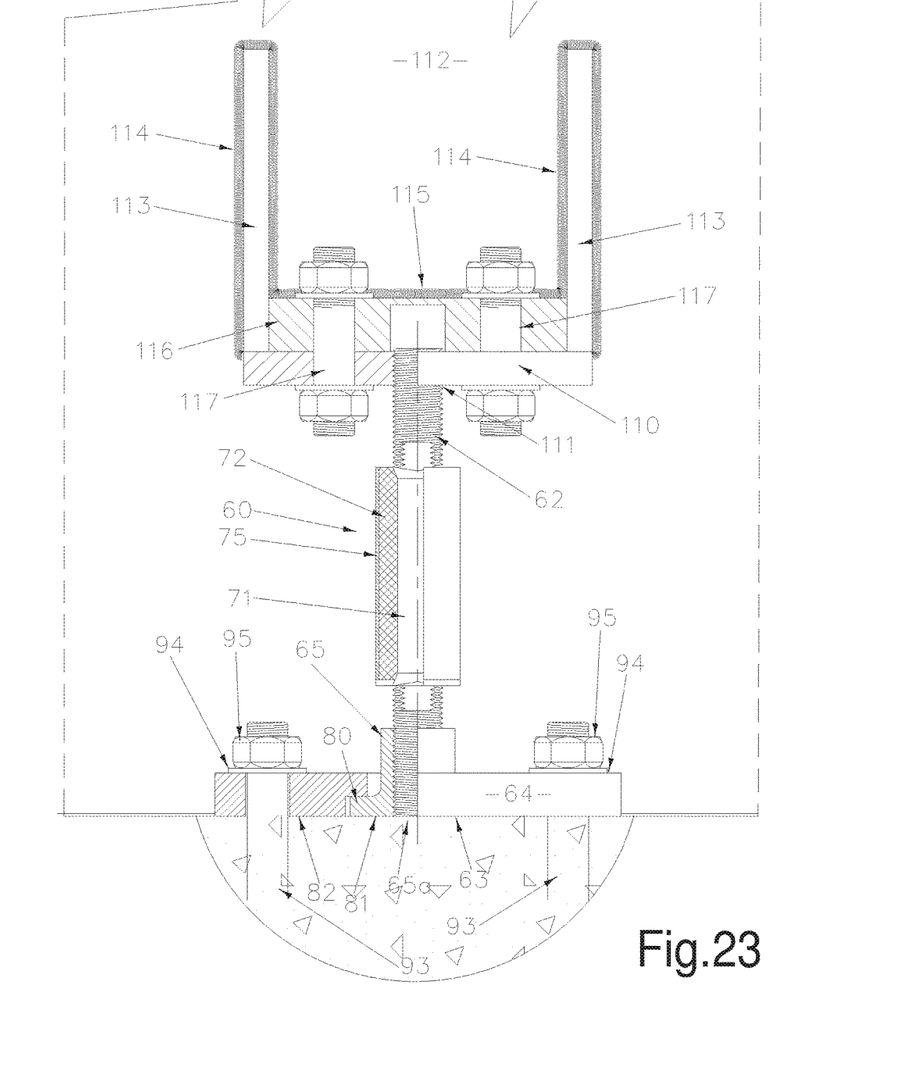
FIG. 23 is a side view, partly in longitudinal section, of a third embodiment of the present invention.
Figure 24:
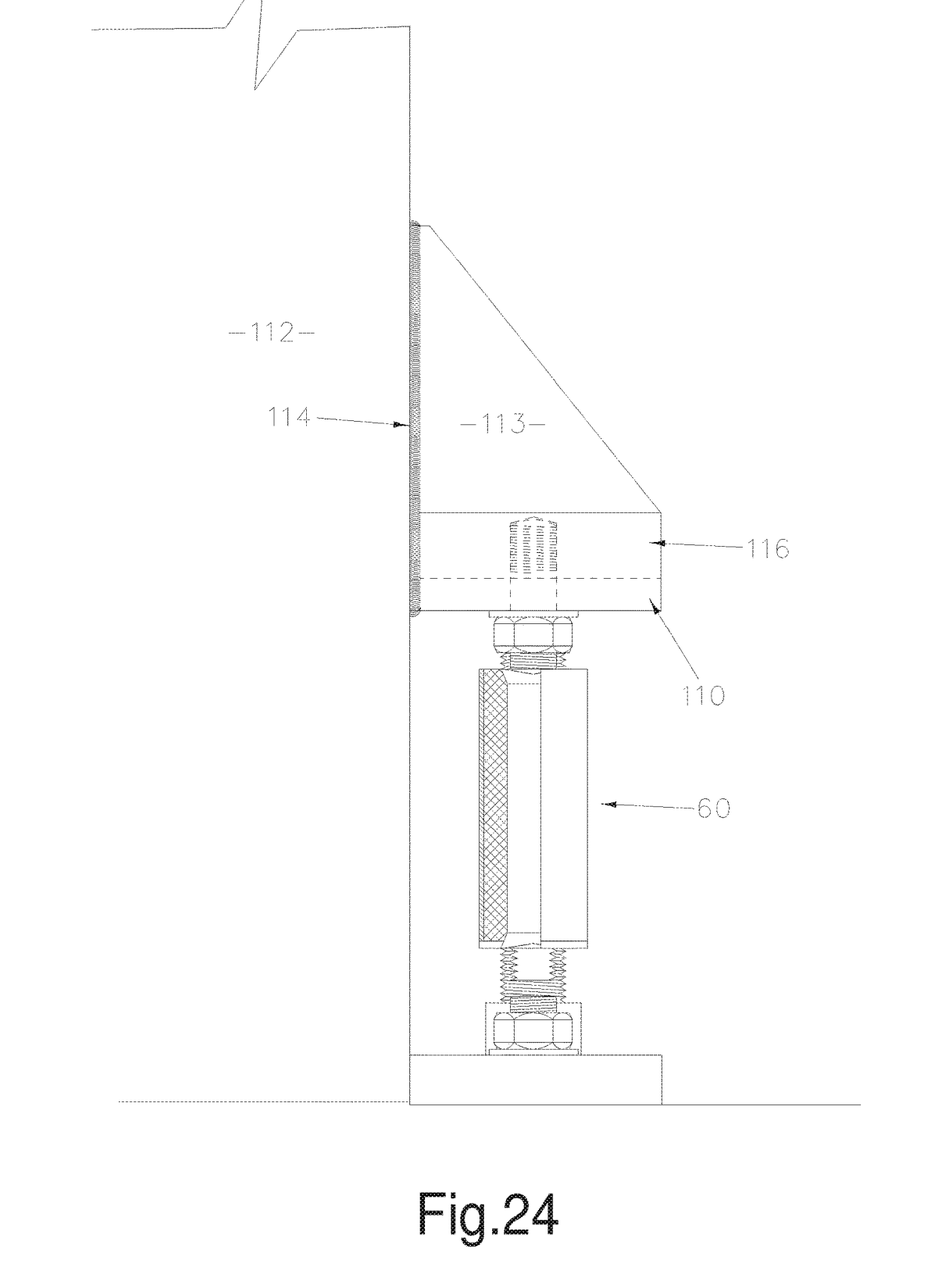
FIG. 24 is a view at right angles to FIG. 23.

However, in cases where it is impossible or undesirable to retrofit a skirt to the tank, it is possible to provide a securing assembly as shown in FIGS. 23 and 24.

Referring to FIGS. 23 and 24, the securing assembly 60 is the same as that described with reference to FIGS. 12-21, except that the top plate 61 is replaced by a top plate 110, which is a flat plate, rectangular in plan, and provided with a central screw threaded aperture 111. The aperture 111 is dimensioned to engage the first larger diameter portion of the securing rod 62.

The upper surface of the top plate 110, (i.e. the surface furthest from the rest of the securing assembly) is bolted to a reinforcing plate 116 by a pair of spaced bolts 117 which pass right through preformed apertures in the top plate and the reinforcing plate, and is secured by nuts in known manner. Two spaced triangular brackets 113 are welded to the reinforcing plate 116; each triangular bracket is arranged with one of its vertical edges 114 extending substantially vertical, and flush with the edge 115 of the reinforcing plate, which in use lies adjacent the tank or other article to be secured.

The securing assembly is secured to the exterior wall of a tank 112 by welding to the wall of the tank the edge 115 of the plate 116 and each of the vertical edges 114 of the triangular brackets 113.

The footing 63 is secured to the floor or other underlying surface in the same manner as described with reference to FIGS. 12-21. Securing assemblies as shown in FIGS. 23-24 are secured at spaced intervals around the tank, as described with reference to FIGS. 12-21.

In all of the above described embodiments, the securing rod 22/62 has been described as having a reduced strength third portion 43/71 which is circular in cross-section. This is advantageous from a manufacturing point of view, if the third portion is formed integrally with the first and second portions 40, 41/69, 70, bearing in mind that the first and second portions have to be circular in cross-section, because they are screw threaded. However, it is not an essential feature of the invention—the reduced strength portion may be formed with a different cross-sectional shape.

Further, it is not an essential feature of the invention that the three portions of the securing rod are formed integrally:—for some applications, it may be advantageous to form the reduced strength from a different material to the first and second portions, in order to provide the necessary properties for the rod.

If the first, second and third portions of the rod are formed integrally, then the reduction in strength of the third portion is achieved by reducing the cross-sectional area of the third portion compared to the first and second portions.

However, if the third portion is made from a different material to the first and second portions, the lower strength of the third portion may be achieved either by reducing its cross-section area and/or selecting a lower-strength material.

In one preferred embodiment of the invention, the whole of the rod is made from mild steel (e.g. a grade 300 mild steel), which has the requisite ductility, but is not corrosion resistant. Forming the whole of the rod from stainless steel improves the corrosion resistance, but may present problems in that a majority of readily available stainless steels are too high in strength and too low in ductility to be suitable for the reduced strength portion. It is envisaged that the first and second portions may be made from stainless steel and connected to a mild steel third portion, which may be coated or provided with a protective wrapping to reduce corrosion problems. The connection may be formed by any suitable means e.g. by welding, by gluing, or by using a combination of a sleeve and interference fit.

It will be appreciated that the dimensions and materials of each securing assembly, and in particular the dimensions and materials of each rod, must be selected with regard to the mass and shape of the article to be secured.

In all of the above described embodiments, the design of each securing assembly is such that the response of an article such as a tank to an event such as an earthquake is controlled by means of the controlled yielding of each rod of each securing assembly. Thus, in each of the embodiments described above, the rod of the securing assembly is designed to be the weakest point of the assembly. The controlled yielding of each rod absorbs considerable energy, whether the rod is yielding under tensile stress or under compressive stress. As noted above, the fact that each rod is surrounded by a bearing helps to stop the rod buckling under compressive stress.

In a typical earthquake, there is not a single movement in one direction:—there are repeated movements in several directions, and thus it is likely that in a single earthquake, each rod will be deformed repeatedly in both tension and compression. This is likely to cause strain hardening, so normal good practice would be to inspect and replace (if needed) each of the rods after a significant seismic event.

An example of one suitable securing system for securing a large wine tank, using the system described with reference to FIGS. 12-22, is as follows:

Tank capacity—266,000 liters.
Tank diameter—5.85 meters.
Tank height—10.2 meters.
Skirt thickness—8 millimeters.
Thickness of concrete slab—550 millimeters.
Number of securing assemblies—17.
Diameter of each rod in each securing assembly—27 millimeters.

The invention claimed is:

1. A securing assembly for an article, said securing assembly being capable of securing against both tensile and compressive forces including:
   a footing adapted to be securable to a floor underneath said article;
   a securing rod dimensioned and arranged to be releasably and rigidly securable to said article and to said footing;
   said securing rod providing a first portion at one end thereof and a second portion at the other end thereof, and a third portion having reduced strength compared to said first and second portions, between said first and second portions;
   a bearing dimensioned and arranged to surround and support a substantial proportion of said securing rod;
   wherein said securing rod is arranged to be releasably and rigidly securable to said article via a housing which is rigidly securable to said article and which provides a top plate which is releasably engageable with said first portion of said securing rod; and wherein said first portion of the securing rod is formed with a shoulder which has a larger cross-sectional area than the remainder of said first portion, said shoulder being located between said third portion and the remainder of said first portion; and wherein said top plate is apertured, the dimensions of said aperture being such as to allow said remainder of said first portion to pass through, but to engage said shoulder, such that the adjacent surfaces of the shoulder and the top plate bear against each other.

2. The assembly as claimed in claim 1, wherein said assembly further provides a sleeve dimensioned and arranged to surround and support said bearing.

3. The assembly as claimed in claim 1, wherein the footing includes an anchor plate which is U-shaped in plan and which provides a cutout in the surface of the plate which is closest to the floor in use; said cutout being dimensioned to accommodate the base of a socket which is releasably engageable with said anchor plate and which is designed to be in screw threaded engagement with the second portion of the rod.

4. The assembly as claimed in claim 3, wherein said anchor plate is releasably securable to said floor.

5. The assembly as claimed in claim 1, wherein said bearing surrounds said third portion of the rod.

6. The assembly as claimed in claim 1, wherein the external surfaces of said first and second portions are screw threaded in opposite directions.

7. The assembly as claimed in claim 1, wherein said third portion has a reduced cross-sectional area compared to said first and second portions.

8. The assembly as claimed in claim 1, wherein said third portion is formed separately from said first and second portions and rigidly secured thereto.

9. The assembly as claimed in claim 1, wherein said first, second and third portions are integrally formed.

10. A system for securing an article, said system including:

providing a plurality of securing assemblies as claimed in claim 1;

for each securing assembly, rigidly securing the housing to the article at a selected position around an outer surface of the article;

for each securing assembly, securing said footing to a floor or similar supporting surface underneath said article.

* * * * *